April 26, 1966     C. PANSERI     3,247,591

CLOSURE OF PIPES

Filed May 18, 1962

INVENTOR.

BY *Carlo Panseri*

3,247,591
CLOSURE OF PIPES
Carlo Panseri, Milan, Italy, assignor to Societa per
l'Esercizio dell'Istituto Sperimentale dei Metalli
Leggeri, a corporation of Italy
Filed May 18, 1962, Ser. No. 195,771
Claims priority, application Italy, May 30, 1961,
9,854/61
3 Claims. (Cl. 29—474.3)

My invention relates to a method of closing the ends of thin metal pipes, particularly of sintered aluminum pipes, which may contain considerable amounts of $Al_2O_3$. Such tubes may be used as sheaths for fuel elements in nuclear reactors, particularly those with organic moderators, in which it is necessary that the joint be perfectly tight and mechanically resistant even under high temperature.

It is known that with sintered materials, it is impossible to make use of conventional methods of fusion welding, inasmuch as the fusion would result in impairment of the good mechanical characteristics of the sintered aluminum. Therefore a very restricted choice among welding processes is left, while at the same time, at least in the nuclear field, particularly demanding characteristics of the weld are required.

Pipes with a sufficient wall thickness, for instance those having a thickness of 1.5 mm., may be welded or closed at the ends by means of processes using the known method of flash welding. This method, however, is less easily applicable to thin pipes.

My invention has as an object the closing of thin pipes. While my invention is intended primarily for the tight closing of thin-walled pipes of sintered aluminum, i.e. with wall thickness less than 1.5 mm., it may also be applied to pipes of average thickness (1.5 mm.).

The method of my invention consists in introducing the aluminum pipe, together with a U-shaped plug of the same material which is to be welded to it, into a rotating ring of heated steel so as to heat both the pipe and the plug to a suitable temperature, e.g. 400° C., and subsequently pressing the side wall of the plug against the pipe wall with the head of a loose spindle mandrel, so that the heated, intimately contacted surfaces almost undergo a lamination process and are welded to each other.

Figure 1:
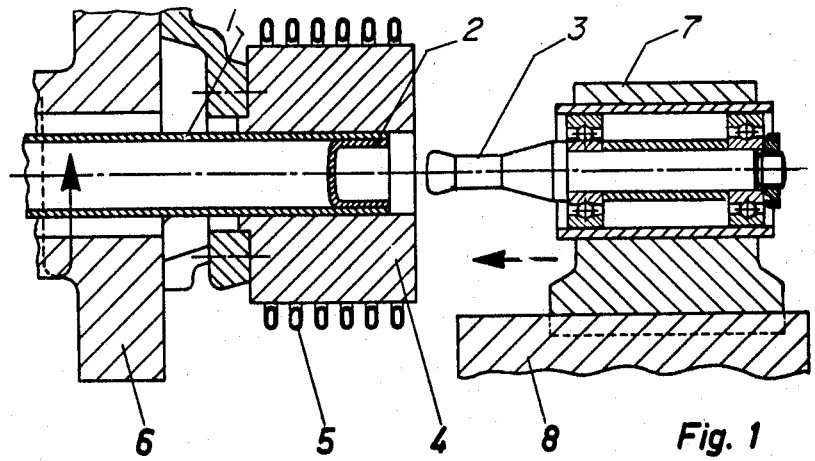
Figure 2:
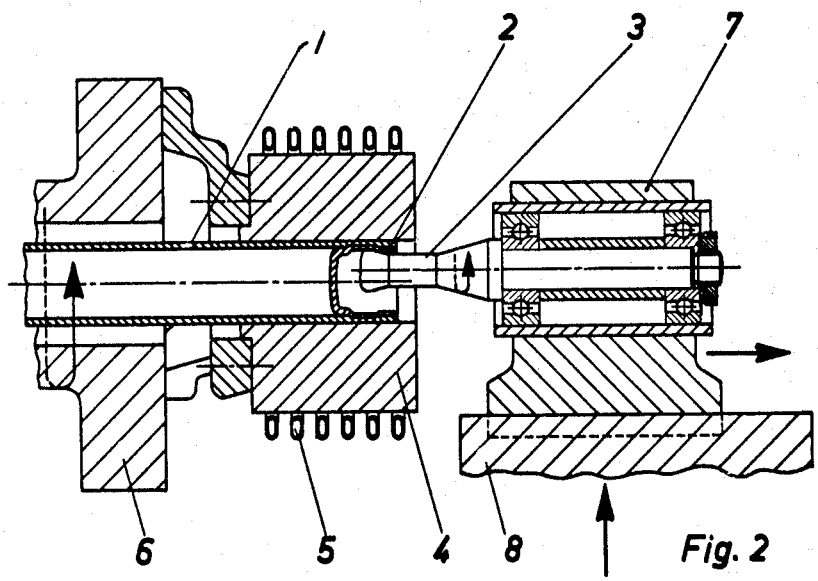

The method of the invention can be carried out with a device as illustrated in FIGS. 1 and 2 of the accompanying drawings, which show the successive working steps.

The pipe 1, to which the plug 2 is to be welded, is introduced into a strong steel ring 4 mounted on a rotating platform 6. The steel ring 4 is heated, by means of an induction coil 5, to a suitable temperature, e.g. 400° C., to heat both the end of the pipe and the plug. When the pipe end and plug are at operating temperature, a spindle mandrel 3 is shifted towards the end of the pipe (in the direction of the arrow in FIG. 1), the spindle being loose-mounted on a bearing 7 which is coaxial with the axis of rotation of rotating platform 6, and which slides on a guide 8. When the bulbous head of the spindle touches the bottom of the plug (see FIG. 2) the spindle axis is gradually shifted so as to crush the plug wall against the pipe wall which is against the inside wall of the ring; simultaneously automatically setting the spindle in motion to impart a clockwise motion and a reverse axial (in the direction of the arrow in FIG. 2) motion thereto.

This results in a kind of lamination of the elements to be welded, whose intimately contacted surfaces are welded each to the other.

The plugs 2 are made up of the same material as the pipes and are prepared either from sintered aluminum having an $Al_2O_3$ content equal to that of the pipes to which they must be welded (e.g. 4%, 7%, 10%, 14% $Al_2O_3$), or by means of mechanical working starting from an extruded bar of suitable diameter, or by embossing a sintered aluminum laminate of suitable thickness, or finally by means of press moldings. Plugs prepared by such means have been successfully used for closing metal pipes with thin walls according to the present invention, particularly those which are the most useful in the nuclear field (4%–7% $Al_2O_3$).

The embossing method moreover, lends itself to a further improvement of the method of the invention, for when employing laminates of sintered aluminum provided with a plating of aluminum or its alloy, the coating assists the welding.

Pipes of sintered aluminum with sintered aluminum plugs welded thereto by the method of my invention have proved to be perfectly tight in tests with a helium leak detector. Hydraulic pressure tests result either in the pipe breaking out of the welded zone, or tearing at the bottom, under breaking pressure equal to the breaking load of the basic material. Breaking did not occur under pressures lower than 190 kg./cm.$^2$. Breaking of the welded pipe happened more frequently at pressures of 220–250 kg./cm.$^2$.

I claim:

1. A process for closing by hot pressure a thin-walled metal pipe, intended particularly for manufacturing sheaths of fuel elements for nuclear reactors, said metal pipe consisting essentially of sintered products of partially oxidized aluminum powder; which comprises introducing the metal pipe, and a U-shaped plug of the same material arranged with the open end extending toward the open end of the pipe, into a rotating steel ring, heating the steel ring, pipe and plug to about 400° C., and subsequently pressing the side wall of the plug against the inner wall of the pipe with the bulbous head of a spindle mandrel rotatably mounted in a bearing so that the heated, intimately contacted surfaces of the pipe and plug become welded to each other.

2. A process for closing by hot pressure a thin-walled pipe, intended particularly for manufacturing sheaths of fuel elements for nuclear reactors, said metal pipe consisting essentially of sintered products of partially oxidized aluminum powder, which comprises introducing the metal pipe, and a U-shaped embossed plug coated with a material selected from the group consisting of aluminum and alloys thereof, arranged with the open end extending toward the open end of the pipe, into a rotating steel ring, heating said steel ring from the outside whereby the pipe and plug are heated to about 400° C., subsequently pressing the side wall of the plug against the inner pipe wall with the bulbous head of a spindle mandrel rotatably mounted in a bearing, imparting a spiral mandrel motion to said spindle and withdrawing said spindle mandrel from the plug so that the heated, intimately contacted surfaces of the pipe and plug become crushed together and welded to each other.

3. Apparatus for closing thin-walled metal pipes by hot pressure, which comprises a ring mounted on a rotating platform, heating means on the outer surface of said ring, the interior surface of said ring being adapted to contain the workpiece, and a spindle mandrel having a bulbous head rotatably mounted in a bearing, said spindle being transversely movable into and out of said workpiece, and means for moving the spindle axis to an offset position from the axis of the workpiece.

(References on following page)

References Cited by the Examiner

UNITED STATES PATENTS

| | | |
|---|---|---|
| 758,145 | 4/1904 | Nordenskjold. |
| 766,227 | 8/1904 | Doolittle. |
| 2,124,741 | 7/1938 | Knudsen. |
| 2,209,739 | 7/1940 | Meyer. |
| 2,554,076 | 5/1951 | Vissat _____ 219—9.5 XR |
| 2,821,323 | 1/1958 | Lee _____ 220—24.5 |
| 2,847,757 | 8/1958 | Mock et al. _____ 29—523 |
| 3,013,332 | 12/1961 | Terrell _____ 29—497.5 XR |
| 3,091,847 | 6/1963 | Peters _____ 29—497.5 XR |

JOHN F. CAMPBELL, *Primary Examiner*.